Aug. 31, 1954   N. L. RHODES ET AL   2,687,836
HANGER BRACKET FOR AUTOMOBILE WINDOW TRIM
Filed Feb. 10, 1951

INVENTORS.
NORRIS L. RHODES
BY VERN D. WILLIAMS

*Stoodling and Krost* attys.

Patented Aug. 31, 1954

2,687,836

UNITED STATES PATENT OFFICE 2,687,836

HANGER BRACKET FOR AUTOMOBILE WINDOW TRIM

Norris L. Rhodes, Chardon, and Vern D. Williams, Findlay, Ohio; said Williams assignor to said Rhodes Application February 10, 1951, Serial No. 210,381

6 Claims. (Cl. 224—42.45)

The invention relates in general to hanger brackets such as a hanger bracket adapted to be mounted on the trim above an automobile window.

In the past many types of hanger brackets or article supports have been designed for use on moldings, but none for successful mounting on trims of automobiles. Moreover, the majority of these brackets provide expensive manufacturing costs or are very difficult to mount, thus making them impractical as successful brackets, particularly on trims for automobiles.

With these views in mind, one of the objects of the present invention is to make an inexpensive article support or hanger bracket which may be easily mounted on the trim above an automobile window.

Another object of the invention is to make a hanger bracket from a single piece of sheet metal, or a combination of sheet metal and plastic.

Another object of the invention is to make a hanger bracket from a single piece of sheet metal which can be removably and easily mounted on the window trim of an automobile without engaging the glass in the window.

Another object of my invention is the provision of a standard hanger bracket which may be modified by an interchangeable pad to accommodate trims for all makes of automobiles.

Other objects and a fuller understanding of the invention may be had by referring to the following description and claims, taken in conjunction with the accompanying drawings, in which:

Figure 7:
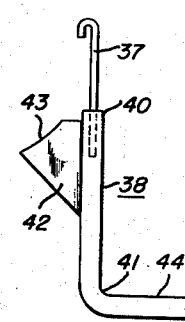
Figure 7 is a side view of a modified hanger bracket comprising both metal and plastic.
Figure 8:
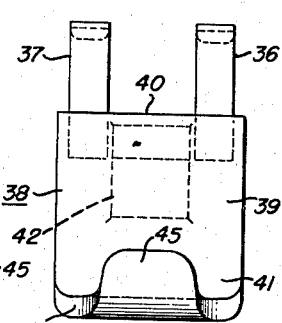
Figure 8 is a front view of Figure 7.

The hanger bracket illustrated in Figures 1 to 6 is preferably constructed from sheet metal to provide the necessary degree of strength and at the same time maintain a minimum cost. It is understood, however, that the hanger bracket can be constructed from any other suitable materials such, for example, as from plastics or a combination of sheet metal and plastic as shown in Figures 7 and 8. When the entire hanger bracket is constructed from sheet metal, it is preferably formed by punch press operations. The sheet metal must be punched, blanked and bent in required steps to form the finished product. Similar parts in various figures of the drawings are referred to by the same reference characters.

Figure 1:
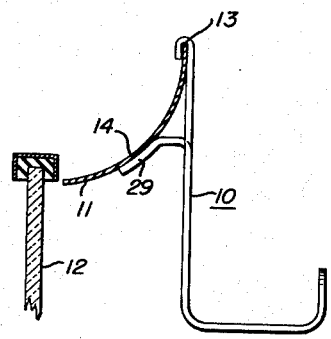
Figure 1 is a side view of a standard hanger bracket removably mountable on the trim above an automobile window.
Figure 2:
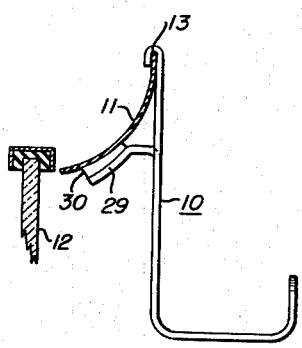
Figure 2 is a view similar to the view of Figure 1, but shows a medium thickness pad mounted on the rear brace member to accommodate a different design trim.

In Figure 1 of the drawings, the hanger bracket 10 is illustrated as being mounted on a window trim 11 above a window glass 12 of an automobile. The window trim and the window glass are both illustrated fragmentarily with only a sufficient amount thereof being shown to illustrate the features of the hanger bracket 10. Thus, for purposes of description the window trim 11 is illustrated as having an upper edge 13 and a bottom curved or arcuate surface 14.

The hanger bracket of Figures 1 to 6 comprises an L-shaped member having a first part 20 constituting a vertically disposed suspension arm and a second part 21 constituting a horizontally disposed hanger support arm upon which one or more clothes hangers or other articles may be mounted. The suspension arm 20 comprises a body portion 22, two spaced suspension hook members 26 and 27 and a stabilizing brace member 28. The body portion 22 has an upper end 23 and a lower end 24. The horizontally disposed hanger support arm 21 is preferably integrally connected to the lower end 24 of the body portion 22 and extends laterally therefrom and terminates in an upwardly extending ledge 25. The horizontally disposed hanger support arm 21 and the ledge 25 constitutes a major horizontal hook or support from which one or more clothes hangers or other articles may be mounted in the automobile.

Figure 5:
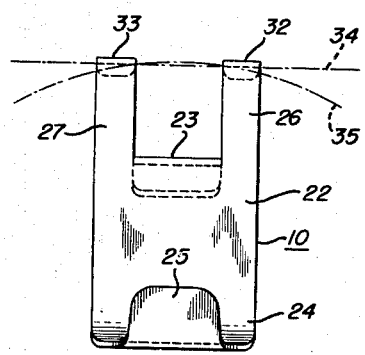
Figure 5 is a flat or front view of the standard hanger bracket.
Figure 6:
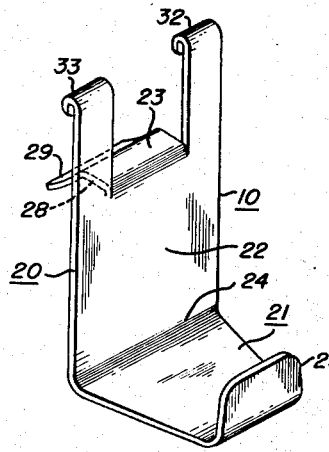
Figure 6 is a perspective view of the standard hanger bracket.

The stabilizing brace member 28 is preferably integrally connected to the upper end 23 of the body portion 22 and extends laterally therefrom in a rearward direction which is opposite to the direction that the hanger support arm 21 extends from the body portion 22. The suspension hook members 26 and 27 are preferably integrally connected to the upper end 23 of the body portion 22 on opposite sides of the stabilizing brace member 28. The suspension hook members 26 and 27 extend upwardly from the body portion 22 and each terminate in a hook portion 32 and 33 respectively folded back upon itself. The hook portions 32 and 33 are adapted to engage the upper edge of the window trim 11 as illustrated in Figures 1 and 5 of the drawing. Inasmuch as the hook portions 32 and 33 are spaced apart, they are adapted to engage either a window trim having a straight upper edge, such as illustrated by the line 34 or a curved upper edge such as illustrated by the line 35, see Figure 5. The stabilizing brace member 28 terminates into a standard pad portion 29 which is adapted to abut against the bottom arcuate portion 14 of the trim to thereby stabilize and hold the body portion 22 at a spaced distance from the window glass 12 of the automobile when the hook portions 32 and 33 are mounted on the upper edge of the trim.

In hangers of this type, it is necessary to have a structure which will not be bumped against the window glass when a coat or other weight is supported by the hanger support arm 21. In this invention, the stabilizer brace member 28 protects the window by stabilizing or holding the body portion 22 away from the window. The stabilizing brace member 28 also prevents the hook portions 32 and 33 from lifting up and becoming disengaged from the upper edge of the trim by bouncing or jolting of the car. The combination of the two hook portions 32 and 33, and the stabilizing brace member 28 provides a three-point engagement whereby the entire hanger bracket is firmly held in place.

Figure 3:
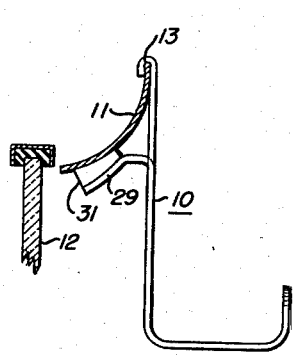
Figure 3 is a view similar to the view of Figure 1, but shows a maximum thickness pad mounted on the rear brace member to accommodate a further different design trim.
Figure 4:
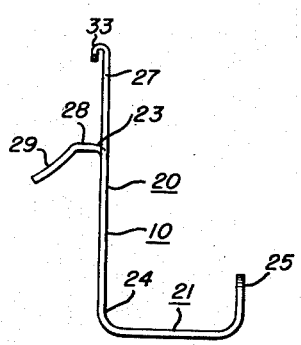
Figure 4 is a side view of the standard hanger bracket of Figure 1.

The trim above the windows in automobiles of different makes may vary slightly. In this invention, a standard hanger bracket is constructed such as shown in Figures 1, 4, 5 and 6. This standard bracket is adapted to fit the trim of a particular design. The standard hanger bracket may then be modified to fit window trims of different designs. In making this modification, the hanger bracket is of such design that only one change need to be made to make the standard hanger bracket fit the window trim of a different design; in that a pad element 30 of medium thickness may be suitably connected to the standard pad 29. The pad element 30 may comprise any resilient material such as felt and it may be suitably fastened to the standard pad 29, such as by glue or other bonding material. In Figure 3, we show a further pad element 31 which is of maximum thickness and by mounting the pad element 31 to the standard pad 29, the combination operates to fit a window trim on a still further line of automobiles. The pad element 31 may be constructed of felt or any other cushion material and may be suitably anchored to the standard pad 29 by glue or other bonding material. Thus, it is to be observed that the standard hanger bracket may be modified simply by bonding thereto pad elements of variable thicknesses to accommodate the window trim for cars of different makes. This construction provides a minimum of cost in the manufacture of the device, and yet is adaptable to accommodate various design of trims or moldings of various makes of cars.

In Figures 7 and 8, we show a modified hanger bracket, in that the hook members 36 and 37 are molded into a plastic unit 38, which combination provides a structure that functions substantially the same as that described in Figures 1 to 6. The hook members 36 and 37 are preferably made of metal stampings and the plastic unit 38 is preferably constructed of an integrally formed piece. The plastic unit 38 comprises a body portion 39 having upper and lower edges 40 and 41. The hook members 36 and 37 are imbedded in the upper portion 40 of the plastic body member 39 and extend vertically therefrom and function in the same manner as the two hook members 26 and 27 as described in the Figures 1 to 6. Extending rearwardly of the plastic body portion 39 is a stabilizing brace member 42 having an arcuate pad surface 43 which is adapted to abut against the lower portion 14 of the trim 11 to thereby stabilize or hold the body portion 39 at a spaced distance from the window when the hook members 36 and 37 are mounted on the upper edge of the trim 11. Integrally connected to the bottom edge of the body portion 39 is a horizontally disposed hanger support arm 44 which terminates in a ledge 45. The article support as shown in Figures 7 and 8 may be modified to accommodate various types of trim by mounting or otherwise securing pad elements thereto in different thicknesses to fit different styles of trims. The general method of mounting the article support shown in Figures 7 and 8 is the same as that described with reference to Figures 1 to 6 and the operation is such that when the hook members 36 and 37 are hooked over the trim of an automobile, the stabilizing brace abuts the lower brace member 42 of the trim to firmly stabilize or hold the body portion 39 away from the glass when a coat or other garment is suspended therefrom.

What is claimed is:

1. A hanger bracket adapted to be mounted on the trim above an automobile window, said bracket consisting of an L-shaped member having a first part constituting a vertically disposed suspension arm and a second part constituting a horizontally disposed hanger support arm, said suspension arm comprising a body portion, two spaced suspension hook members and a stabilizing brace member, said body portion having upper and lower end regions, said horizontally disposed hanger support arm being connected to the lower end region of said body portion and extending laterally therefrom and terminating in an upwardly extending ledge, said stabilizing brace member being connected to the upper end region of said body portion and extending laterally therefrom in a direction opposite to said hanger support arm, said suspension hook members being connected to the upper end region of said body portion on opposite sides of said stabilizing brace member, said suspension hook members extending upwardly from the said body portion and each terminating in a hook portion folded back upon itself, in the same direction as said stabilizing brace member extends away from said body portion, said brace member terminating at a place which is a greater distance from said body portion than the place at which said folded back hook members terminate from said body portion, said hook portions being adapted to engage the upper edge of the trim above the automobile window, said stabilizing brace member terminating in a pad portion to abut against a bottom portion of the trim to thereby stabilize or hold the body portion at a spaced distance from the window when the hook portions are mounted on the upper edge of the trim.

2. A hanger bracket adapted to be mounted on the trim above an automobile window, said bracket consisting of an L-shaped member having a first part constituting a vertically disposed suspension arm and a second part constituting a horizontally disposed hanger support arm, said suspension arm comprising a body portion, two spaced suspension hook members and a stabilizing brace member, said body portion having upper and lower end regions, said horizontally disposed hanger support arm being connected to the lower end region of said body portion and extending laterally therefrom and terminating in an upwardly extending ledge, said stabilizing brace member being connected to the upper end region of said body portion and extending laterally therefrom in a direction opposite to said hanger support arm, said suspension hook members being connected to the upper end region of said body portion on opposite sides of said stabilizing brace member, said suspension hook members extending upwardly from the said body portion and each terminating in a hook portion folded back upon itself, in the same direction as said stabilizing brace member extends away from said body portion, said brace member terminating at a place which is a greater distance from said body portion than the place at which said folded back hook members terminate from said body portion, said hook portions being adapted to engage the upper edge of the trim above the automobile window, said stabilizing brace member terminating in a pad portion to abut against a bottom portion of the trim to thereby stabilize or hold the body portion at a spaced distance from the window when the hook portions are mounted on the upper edge of the trim, said hanger bracket being constructed of sheet metal and comprising one single piece.

3. A hanger bracket adapted to be mounted on the trim above an automobile window, said bracket consisting of an L-shaped member having a first part constituting a vertically disposed suspension arm and a second part constituting a horizontally disposed hanger support arm, said suspension arm comprising a body portion, two spaced suspension hook members and a stabilizing brace member, said body portion having upper and lower end regions, said horizontally disposed hanger support arm being connected to the lower end region of said body portion and extending laterally therefrom and terminating in an upwardly extending ledge, said stabilizing brace member being connected to the upper end region of said body portion and extending laterally therefrom in a direction opposite to said hanger support arm, said suspension hook members being connected to the upper end region of said body portion on opposite sides of said stabilizing brace member, said suspension hook members extending upwardly from the said body portion and each terminating in a hook portion folded back upon itself, in the same direction as said stabilizing brace member extends away from said body portion, said brace member terminating at a place which is a greater distance from said body portion than the place at which said folded back hook members terminate from said body portion, said hook portions being adapted to engage the upper edge of the trim above the automobile window, said stabilizing brace member terminating in a pad portion to abut against a bottom portion of the trim to thereby stabilize or hold the body portion at a spaced distance from the window when the hook portions are mounted on the upper edge of the trim, said suspension hook members being constructed of sheet metal and the remaining parts being constructed of plastic material.

4. A hanger bracket adapted to be mounted on the trim above an automobile window, said bracket consisting of an L-shaped member having a first part constituting a vertically disposed suspension arm and a second part constituting a horizontally disposed hanger support arm, said suspension arm comprising a body portion, two spaced suspension hook members and a stabilizing brace member, said body portion having upper and lower end regions, said horizontally disposed hanger support arm being connected to the lower end region of said body portion and extending laterally therefrom and terminating in an upwardly extending ledge, said stabilizing brace member being connected to the upper end region of said body portion and extending laterally therefrom in a direction opposite to said hanger support arm, said suspension hook members being connected to the upper end region of said body portion on opposite sides of said stabilizing brace member, said suspension hook members extending upwardly from the said body portion and each terminating in a hook portion folded back upon itself, in the same direction as said stabilizing brace member extends away from said body portion, said brace member terminating at a place which is a greater distance from said body portion than the place at which said folded back hook members terminate from said body portion, said hook portions being adapted to engage the upper edge of the trim above the automobile window, said stabilizing brace member terminating in a pad portion to abut against a bottom portion of the trim to thereby stabilize or hold the body portion at a spaced distance from the window when the hook portions are mounted on the upper edge of the trim, said pad portion of said stabilizing brace member including a pad element secured thereto.

5. A hanger bracket adapted to be mounted on a trim comprising a side wall having upper and lower edges, said side wall at the upper edge extending laterally outwardly from the side wall at the lower edge, said bracket consisting of an L-shaped member having a first part constituting a vertically disposed suspension arm and a second part constituting a horizontally disposed hanger support arm, said suspension arm comprising a body portion, suspension hook means and a stabilizing brace member, said body portion having upper and lower end regions, said horizontally disposed hanger support arm being connected to the lower end region of said body portion and extending laterally therefrom and terminating in an upwardly extending end, said stabilizing brace member being connected to the upper end region of said body portion and extending laterally therefrom in a direction opposite to said hanger support arm, said suspension hook means being connected to the upper end region of said body portion and extending upwardly therefrom, said suspension hook means comprising spaced hook portions folded back upon themselves, in the same direction as said stabilizing brace member extends away from said body portion, said brace member terminating at a place which is a greater distance from said body portion than the place at which said folded back hook members terminate from said body portion, said spaced hook portions being disposed on opposite sides of said stabilizing brace members and constructed to engage the upper edge of the trim, said stabilizing brace member having a contact portion to abut against the side wall of the trim to thereby stabilize and hold the said body portion of the vertically disposed suspension arm at a fixed position relative to the side wall of the trim.

6. A hanger bracket adapted to be mounted on a trim comprising a side wall having upper and lower edges, said side wall at the upper edge extending laterally outwardly from the side wall at the lower edge, said bracket consisting of an L-shaped member having a first part constituting a vertically disposed suspension arm and a second part constituting a horizontally disposed hanger support arm, said suspension arm comprising a body portion, suspension hook means and a stabilizing brace member, said body portion having upper and lower end regions, said horizontally disposed hanger support arm being connected to the lower end region of said body portion and extending laterally therefrom and terminating in an upwardly extending end, said stabilizing brace member being connected to the upper end region of said body portion and extending laterally therefrom in a direction opposite to said hanger support arm, said suspension hook means being connected to the upper end region of said body portion and extending upwardly therefrom, said suspension hook means comprising spaced hook portions folded back upon themselves, in the same direction as said stabilizing brace member extends away from said body portion, said brace member terminating at a place which is a greater distance from said body portion than the place at which said folded back hook members terminate from said body portion, said spaced hook portions being disposed on opposite sides of said stabilizing brace members and constructed to engage the upper edge of the trim, said stabilizing brace member having a contact portion to abut against the side wall of the trim to thereby stabilize and hold the said body portion of the vertically disposed suspension arm at a fixed position relative to the side wall of the trim, said suspension hook means and said stabilizing brace member solely supporting said bracket on said trim.

References Cited in the file of this patent

UNITED STATES PATENTS

| Number | Name | Date |
|---|---|---|
| 888,032 | Peterson | May 19, 1908 |
| 1,103,721 | Williams | July 14, 1914 |
| 1,856,847 | Gates | May 3, 1932 |
| 2,522,174 | Hermsmeyer | Sept. 12, 1950 |
| 2,528,794 | Seidler | Nov. 7, 1950 |
| 2,542,369 | Steendahl | Feb. 20, 1951 |
| 2,557,537 | Ellison | June 19, 1951 |